US012090421B2

(12) United States Patent
Li et al.

(10) Patent No.: US 12,090,421 B2
(45) Date of Patent: Sep. 17, 2024

(54) MULTIPHASE SEPARATION SYSTEM (71) Applicant: ExxonMobil Technology and Engineering Company, Spring, TX (US)

(72) Inventors: Zhen Li, Houston, TX (US); Michael D. Olson, Fort Worth, TX (US); Parag A. Gupte, Sugar Land, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 469 days.

(21) Appl. No.: 17/446,869

(22) Filed: Sep. 3, 2021

(65) Prior Publication Data
US 2021/0394084 A1 Dec. 23, 2021

Related U.S. Application Data (63) Continuation of application No. 15/521,822, filed as application No. PCT/US2014/063515 on Oct. 31, 2014, now abandoned.

(51) Int. Cl.
*B01D 17/02* (2006.01)
*B01D 17/12* (2006.01)
(Continued)

(52) U.S. Cl.
CPC ..... *B01D 17/0214* (2013.01); *B01D 17/0208* (2013.01); *B01D 17/12* (2013.01);
(Continued)

(58) Field of Classification Search
CPC ................. B01D 17/0214; B01D 17/0208; B01D 17/12; B01D 19/00; B01D 19/0063;
(Continued)

(56) References Cited

U.S. PATENT DOCUMENTS 3,901,811 A 8/1975 Finch
4,778,443 A * 10/1988 Sands .................... C10G 33/06
494/36
(Continued)

FOREIGN PATENT DOCUMENTS

CN 203383786 U * 1/2014
DE 102009019564 A1 * 11/2010 .............. F04B 23/04
(Continued)

OTHER PUBLICATIONS

English Translation of Document Cn 203383786U, Li et al, published Jan. 8, 2014. (Year: 2014).*
(Continued)

*Primary Examiner* — Joseph W Drodge
(74) *Attorney, Agent, or Firm* — ExxonMobil Technology and Engineering Company—Law Department (57) ABSTRACT

The present techniques are directed to a multiphase separation system. The system includes a liquid-liquid separator configured to receive a separated liquid that is further separated into a separated oil and a separated water within the liquid-liquid separator. An oil pump and a water pump, both with adjustable speeds, are configured to pump the separated oil and the separated water, respectively, from the liquid-liquid separator. An interface level in the liquid-liquid separator is regulated by adjusting the speed of the oil pump and the speed of the water pump.

8 Claims, 7 Drawing Sheets

(51) Int. Cl.
*C02F 1/00* (2023.01)
*C02F 1/40* (2023.01)
*C02F 101/32* (2006.01)

(52) U.S. Cl.
CPC ............... *C02F 1/008* (2013.01); *C02F 1/40* (2013.01); *C02F 2101/32* (2013.01); *C02F 2209/42* (2013.01)

(58) Field of Classification Search
CPC ..... B01D 19/0068; B01D 17/02; C02F 1/008; C02F 1/40; C02F 2101/32; C02F 2209/42; C02F 1/20; E21B 43/34; E21B 43/36; E21B 43/40; C10G 33/00; C10G 33/06; C10G 33/08; F04B 49/00; F04B 49/065; F04B 49/20; F04B 2207/044; F04B 23/04; F04B 23/06; F04B 49/103
See application file for complete search history.

(56) References Cited

U.S. PATENT DOCUMENTS

| | | | |
|---|---|---|---|
| 5,108,591 A * | 4/1992 | Hagan | E02B 15/106 210/123 |
| 5,149,443 A * | 9/1992 | Varnam | E02B 15/046 210/776 |
| 5,224,837 A | 7/1993 | Lamphere et al. | |
| 5,394,322 A * | 2/1995 | Hansen | G05B 13/045 700/32 |
| 5,587,896 A * | 12/1996 | Hansen | G05B 13/045 700/39 |
| 6,390,114 B1 | 5/2002 | Haandrikman et al. | |
| 6,719,048 B1 | 4/2004 | Ramos et al. | |
| 7,383,102 B2 | 6/2008 | Coward | |
| 8,489,244 B2 | 7/2013 | Cao et al. | |
| 2004/0244983 A1 | 12/2004 | Appleford et al. | |
| 2005/0250860 A1 | 11/2005 | Appleford et al. | |
| 2009/0149969 A1 | 6/2009 | Slupphaug et al. | |
| 2012/0000643 A1 | 1/2012 | Bruun et al. | |
| 2012/0165995 A1 | 6/2012 | Crawley et al. | |
| 2014/0209465 A1 | 7/2014 | Whitney et al. | |

FOREIGN PATENT DOCUMENTS

| | | | | |
|---|---|---|---|---|
| GB | 2116060 A | * | 9/1983 | ......... B01D 17/0211 |
| GB | 2222961 | | 3/1990 | |
| GB | 2242373 | | 10/1991 | |
| JP | 63143903 U | * | 9/1988 | |

OTHER PUBLICATIONS

English Translation of Document JP 63-143903, Author unknown, published Sep. 21, 1988 (Year: 1988).*

English translation of Patent Publication DE 102009019564, filed Nov. 2010 (Year: 2010).*

Earni, Shankar et al., "Slug Detection as a Tool for Predictive Control of GLCC© Compact Separators," (Jun. 2003), *Journal of Energy Resources Technology*, vol. 125, pp. 145-153.

Olson, Z. et al., "Subsea Compact Separation: Control System Design," OTC-25299-MS, Offshore Tech. Conf., (May 5-8, 2014), Houston, TX, 15 pgs.

Mcgratp45, "Ordinary Differential Equations—A Review of Basic Solutions," Sep. 1, 2010, pp. 1-4 (year: 2010).

Ogunnaike et al., "Process Dynamics, Modeling, and Control," pub. Oxford University Press, New York, 1994, Preface and Chaps. 5-7 and 26, 150 pages (year: 1994).

* cited by examiner

MULTIPHASE SEPARATION SYSTEM

CROSS REFERENCE TO RELATED APPLICATIONS

This application is a continuation of U.S. patent application Ser. No. 15/521,822, filed Apr. 25, 2017, which claims priority to PCT/US2014/063515, filed Oct. 31, 2014, all of which are herein incorporated by reference in their entireties.

FIELD

Exemplary embodiments of the present techniques relate to a multiphase separation system.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The pursuit of oil and gas to satisfy the growing energy demands of such resources has expanded to production operations in deep water. Today, developments in the field of subsea processing lead the way as a possible platform-less solution to enhance oil and gas production in deep water situations. With production equipment located on the seafloor rather than on a fixed or floating platform, subsea processing may provide a solution for fields located in harsh conditions where processing equipment on the surface of the water may encounter risks. Additionally, the use of subsea processes may increase recovery and production from mature or marginal fields.

Future advancements in the field of subsea processing include the continued development of subsea separation systems, which consist of multiple separation devices in series. Furthermore, such advancements also include the design of the control systems for the subsea separation systems. In operation, the control system ensures stable operation of the subsea separation system, for example, under transient conditions such as flow rate fluctuations, slugging, and pipeline pressure drop, among others.

However, the development of a control system for a subsea separation system is not without challenges. For example, there are fewer options and lower performance associated with existing control system equipment, such as subsea sensors and actuators. As a result, the control system may encounter data communication delays between the control system equipment of the subsea separation system and a topside control system. A control system for a subsea separation system may require increased response time, fine-tuning of its controllers, and tight control performance. Thus, due to the relatively small control volumes in the subsea separation equipment and the interaction between different separation devices, the control system may be more challenged to satisfy such performance indicators. Currently, there are several techniques associated with the design of control systems for subsea separation processes.

U.S. Pat. No. 6,390,114 to Handrikman describes a method for suppressing and controlling liquid slugs and gas surges in a flow line of a multiphase fluid from a gas/liquid separator. In particular, the gas/liquid separator includes a liquid outlet with a liquid flow control valve and a gas outlet with a gas flow control valve. A control system for monitoring control variables and adjusting the liquid and gas flow control valves is used to reduce the difference between a selected control variable and a pre-set reference variable.

U.S. Patent Application Publication No. 2012/0165995 by Crawley describes a method for receiving slug attribute information from a sensing system coupled to a fluid processing system and determining whether to activate one or more control devices of the fluid processing system to control slug countermeasures.

Earni, Shankar et al. (2003), Slug Detection as a Tool for Predictive Control of GLCC© Compact Separators, *Journal of Energy Resources Technology*, p. 159. The referenced publication describes a feed forward control configuration that measures disturbances, such as terrain slugging, and that controls liquid levels in a gas-liquid cylindrical cyclone) (GLCC©). In particular, the feed forward control configuration may measure the disturbances and take control action to negate the effect of the disturbance on the liquid levels in the GLCC©.

Subsea separation processes often include a control system with a subsea choke valve used to control the flow of oil and gas from the rock formations at subsea level. The control system may also include other subsea control valves to monitor and regulate a number of factors in the subsea separation process including level controls, pressure differentials, slugging, and flow-rate oscillations, among other parameters. Accordingly, there is a need to monitor and regulate the performance of the subsea separation process by configuring a subsea separation system to provide increased response times and stable operations.

SUMMARY

An aspect of the present disclosure relates to an exemplary embodiment described herein that provides a multiphase separation system. The multiphase separation system includes a liquid-liquid separator configured to receive a separated liquid from a gas-liquid separator. The multiphase separation system includes an oil pump with an adjustable speed configured to pump a separated oil from the liquid-liquid separator. The multiphase separation system includes a water pump with an adjustable speed configured to pump a separated water from the liquid-liquid separator, where an interface level of an oil phase and a water phase in the liquid-liquid separator is regulated by adjusting a speed of the oil pump and a speed of the water pump.

Another aspect of the present disclosure relates to an exemplary embodiment that provides a method of controlling an interface level in a liquid-liquid separator. The method includes receiving a separated liquid into the liquid-liquid separator. The method includes regulating the interface level in the liquid-liquid separator by adjusting a speed of an oil pump with an adjustable speed and a speed of a water pump with an adjustable speed. The oil pump is configured to pump a separated oil from the liquid-liquid separator and the water pump is configured to pump a separated water from the liquid-liquid separator.

Another aspect of the present disclosure relates to an exemplary embodiment that provides a multiphase separation system. The multiphase separation system includes a gas-liquid separator and a liquid-liquid separator positioned downstream of the gas-liquid separator and configured to receive a separated liquid from the gas-liquid separator. The multiphase separation system includes an oil pump with an adjustable speed configured to pump a separated oil from the liquid-liquid separator. The multiphase separation system includes a water pump with an adjustable speed configured to pump a separated water from the liquid-liquid separator. The multiphase separation system includes an oil control valve positioned downstream of the liquid-liquid separator and the oil pump in a flow line comprising the separated oil. The multiphase separation system includes a water control valve positioned downstream of the liquid-liquid separator and the water pump in a flow line comprising the separated water. The multiphase separation system includes an interface level between an oil phase and a water phase in the liquid-liquid separator that is regulated by adjusting the speed of the oil pump and the speed of the water pump and by actuating the oil control valve and the water control valve.

Another aspect of the present disclosure relates to an exemplary embodiment that provides an inverse operating control system for a liquid-liquid separator. The inverse operating control system for the liquid-liquid separator includes a first pump with an adjustable speed configured to pump a first flow line from the liquid-liquid separator. The inverse operating control system for the liquid-liquid separator includes a second pump with an adjustable speed configured to pump a second flow line from the liquid-liquid separator. The interface level of the liquid-liquid separator is regulated by adjusting a speed of the first pump and a speed of the second pump, and where the speed of the first pump is configured to operate inversely from the speed of the second pump.

Another aspect of the present disclosure relates to an exemplary embodiment that provides a control system for a gas-liquid separator. The control system including a liquid control valve positioned between the gas-liquid separator and a liquid-liquid separator in a flow line comprising a separated liquid. The control system including an oil control valve positioned downstream of the liquid-liquid separator and an oil pump in a flow line comprising a separated oil. The control system including a water control valve positioned downstream of the liquid-liquid separator and a water pump in a flow line comprising a separated water. The control system further including a control loop to transmit signals to the liquid control valve, the oil control valve, and the water control valve to regulate a liquid level in the gas-liquid separator, where the control loop is tuned to a critically damped or an overdamped condition.

DESCRIPTION OF THE DRAWINGS

The advantages of the present techniques are better understood by referring to the following detailed description and the attached drawings, in which.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

There is an increasing demand on crude oil driven by increased energy consumption. As a result, there is a push to explore uncharted resources such as offshore markets, including deep-water locations and other remote locations. Deep-water reserves, and more widely scattered reserves, may be amenable to subsea processing techniques. As described herein, subsea processing includes the handling and treatment of production fluids at the seabed or below the sea level. Besides its applicability in deep waters, subsea processing techniques may be used to increase overall recovery and accelerate production of hydrocarbons from more conventional reserves, e.g., in shallow water fields.

Figure 1:
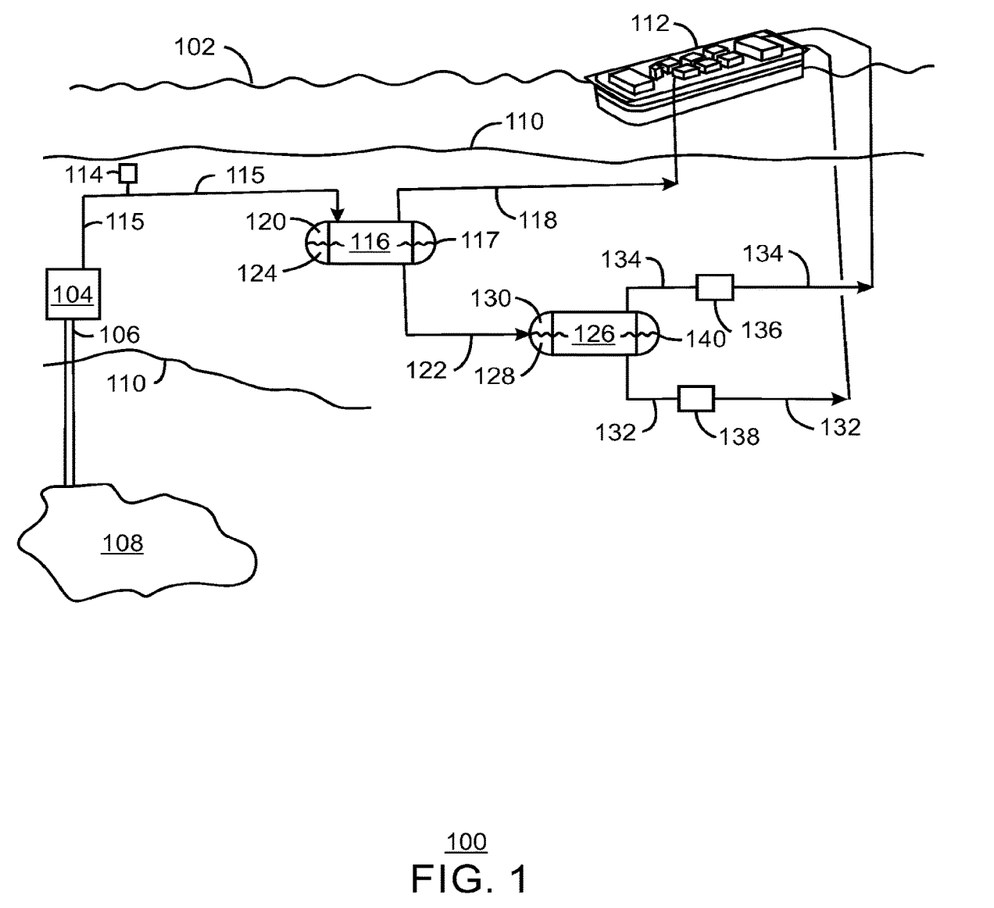
FIG. 1 is a drawing of a subsea oil and gas field with a block diagram of a multiphase separation system, in accordance with one or more embodiments of the present disclosure.

FIG. 1 is a drawing of a subsea oil and gas field 100 with a block diagram of a multiphase separation system. Located below sea level 102, the field 100 includes a wellhead 104 coupled to a well 106 that harvests a multiphase production fluid 108 from a reservoir formation located deep within a seabed 110. The wellhead 104 may include a single wellbore or multiple, branched wellbores. In other embodiments, several wellheads 104 may be coupled to a number of wells 106 throughout the subsea oil and gas field 100.

The wellhead 104 may be connected to a collection platform 112 by a series of flow lines, processing vessels, and umbilical connections, as depicted in FIG. 1. For example, the collection platform 112 may be a floating processing station, such as a floating production storage and offloading unit (FPSO) to treat the multiphase production fluid 108 produced in the subsea oil and gas field 100. As a result, the collection platform 112 may include equipment for separation, water treatment, chemical treatment, and other processing techniques.

Prior to processing the multiphase production fluid 108 on the collection platform 112, the concentration of components in the multiphase production fluid 108 may be monitored, for example, by an analyzer 114 in communication with a production fluid flow line 115. The multiphase production fluid 108 may include gas, oil, water, condensate, and non-hydrocarbon components. The analyzer 114 may determine the concentration of various phases in the multiphase production fluid 108, the concentration of various hydrocarbons within the multiphase production fluid 108, and the concentration of other processed fluids, in addition to a number of other parameters.

The multiphase production fluid 108 may enter a gas-liquid separator 116 via the production fluid flow line 115 in order to be separated into a gas phase and a liquid phase, where a liquid level 117 may exist between the different phases. In some embodiments, the initial separation into the gas and liquid phases may reduce backpressure on the well 106 and the reservoir, thereby increasing production and also mitigating certain flow assurance issues such as hydrate formation and slugging. The gas-liquid separator 116 may reduce transient flows to downstream equipment and provide bulk gas-liquid separation. The gas-liquid separator 116 may include conventional gas-liquid gravity separator vessels or inline separation technologies, among others.

A first flow line 118 including a separated gas 120 may exit an outlet proximate the top ("top-outlet") of the gas-liquid separator 116. Further, a second flow line 122 including a separated liquid 124 may exit an outlet proximate the bottom ("bottom-outlet") of the gas-liquid separator 116. A majority of the gas phase may be removed by degassing the liquid phase in the gas-liquid separator 116. The separated gas 120 may flow to the collection platform 112 for further processing. For example, the separated gas 120 may be routed through scrubbers, compressors, dehydrators, and coolers on the collection platform 112 to produce a treated gas. In some cases, the treated gas may be used as a fuel gas on the collection platform 112 or for artificial lift in the well 106, among other uses.

The separated liquid 124 may be sent to a liquid-liquid separator 126 to be separated into a separated water 128 and a separated oil 130. In some embodiments, before the separated liquid 124 flows into the liquid-liquid separator 126, it may flow into coalescers, desanders, or other treating devices. The water of the separated liquid 124 may make up at least fifty percent by volume of the separated water 128 and the oil of the separated liquid 124 may make up at least fifty percent by volume of the separated oil 130. In some embodiments, emulsion breaking agents may be injected into the second flow line 122 to promote dispersion and separation of water droplets from an oil-continuous phase, oil droplets from a water-continuous phase, or both. The separation of the water and the oil may reduce the need for treatment to prevent hydrate formation or enable subsea water disposal. Otherwise, the separation technique may improve overall production from the well 106. The liquid-liquid separator 126, for example, a pipe or gravity separator, may be designed to tolerate external pressures from a subsea water column or the internal pressures from the production fluids flowing from the well 106.

The separated water 128 may exit the liquid-liquid separator 126 via a water flow line 132. The separated water 128 may contain sand, salt, and minerals such as calcium and barium, among others, in addition to traces of hydrocarbons, in the form of dissolved or entrained gas and oil droplets. Thus, the separated water 128 may be subjected to treatment on the collection platform 112 before it is discharged to sea or pumped into a disposal formation or back into the reservoir. Pumping the separated water 128 into the reservoir may increase the pressure of the reservoir and the well 106, thus, providing an increase in the total production.

The separated oil 130 may exit the liquid-liquid separator 126 via an oil flow line 134. The separated oil 130 may flow into a coalescer, a de-sander, or other treatment equipment located on the collection platform 112, to remove any remaining water, natural gas liquids (NGLs), and solids not removed at the subsea level.

In embodiments described herein, an oil pump 136, disposed in the oil flow line 134, and a water pump 138, disposed in the water flow line 132, are used to control an interface level 140 between the oil phase and the water phase in the liquid-liquid separator 126. The facilities and arrangement of the facilities is not limited to that shown in FIG. 1, as any number of configurations and other facility types may be used in embodiments.

Figure 2A:
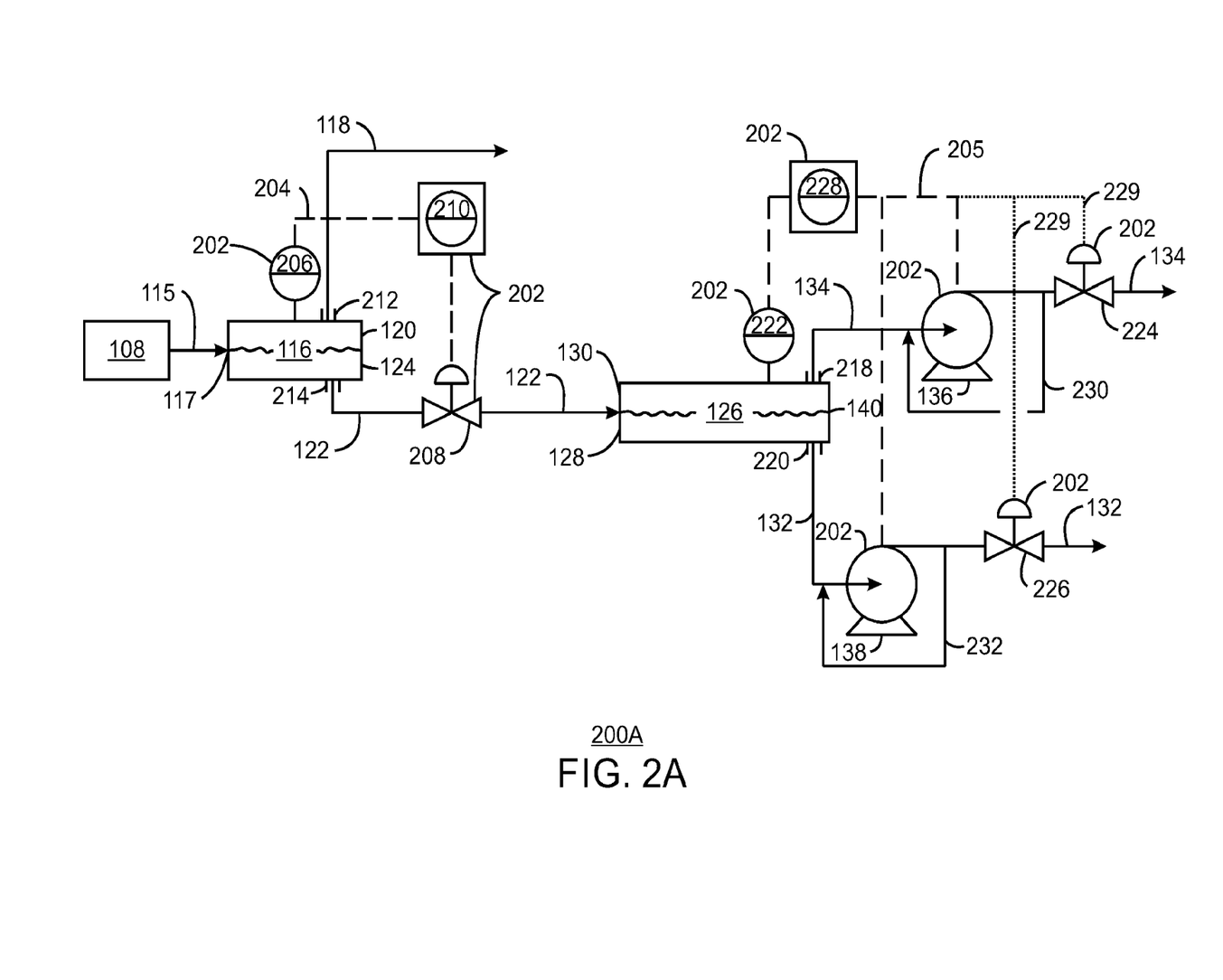
FIGS. 2A and 2B are block diagrams of multiphase separation systems including a control system, in accordance with one or more embodiments of the present disclosure.
Figure 2B:
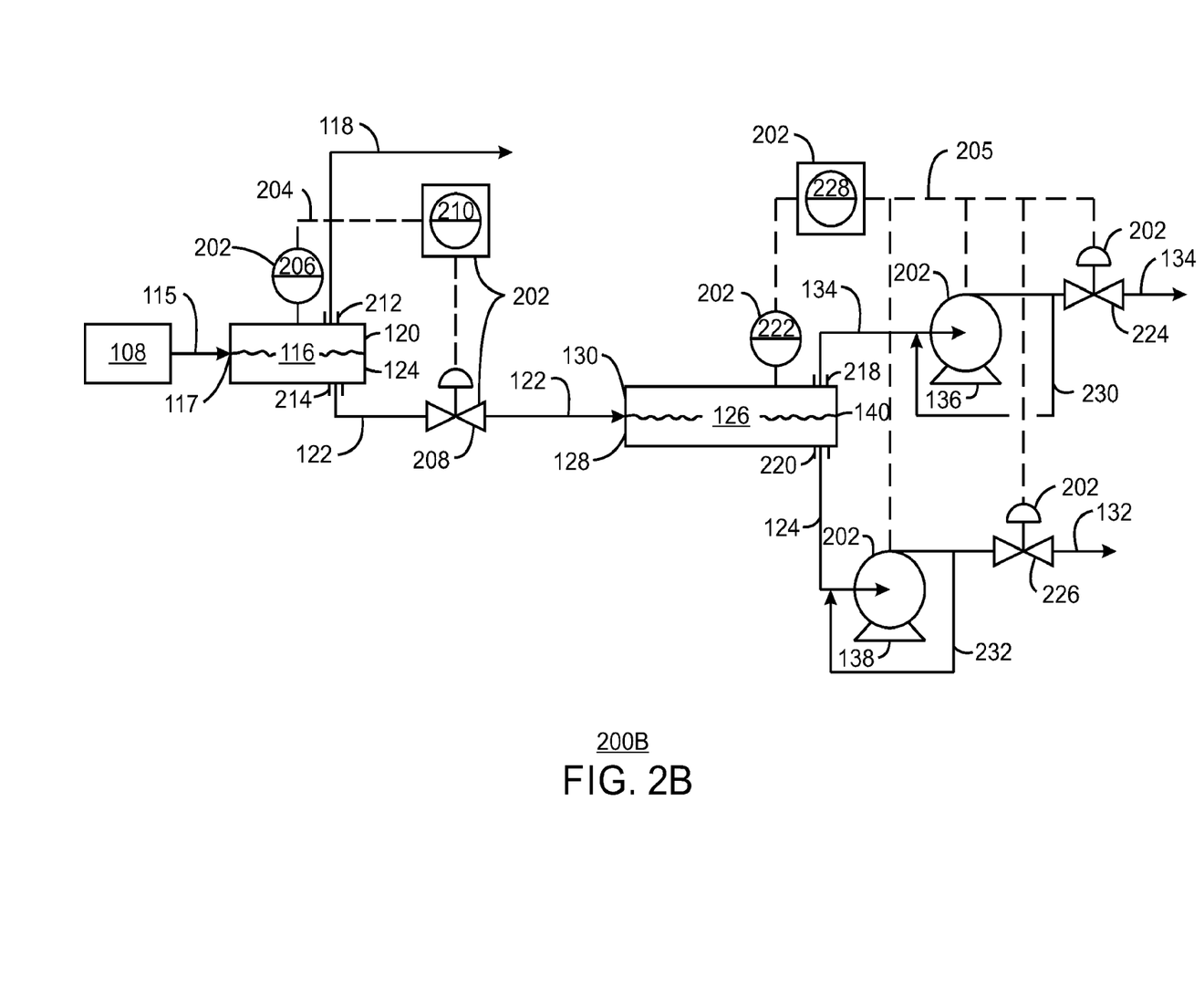

FIGS. 2A and 2B are block diagrams of multiphase separation systems, 200A and 200B, including a control system 202, in accordance with one or more embodiments of the present disclosure. Like numbered items are as described with respect to FIG. 1. As shown in FIG. 2A, the control system 202 may be one component of the multiphase separation system 200A to control and monitor the operation of the system 200A. The control system 202 may be local, for example, as a programmable logic controller (PLC) coupled to equipment within the system 200A. The control system 202 may also be a remote distributed control system (DCS), for example, located aboard a vessel or platform, and coupled to equipment in the multiphase separation system 200A through umbilical cords. The control system 202 initiates communication protocols and automates configurations to provide overall performance control for the multiphase separation system 200A. For example, measurements associated with level detection in subsea separators may be captured by a control loop on a real-time basis to provide a stream of data to control the levels in the subsea separators at their set-point values. As shown in FIG. 2A, the multiphase separation system 200A may include the gas-liquid separator 116 and the liquid-liquid separator 126, each having a corresponding first control loop 204 and a second control loop 205, respectively, as components of the control system 202. In association with the control system 202, the first control loop 204 may include a liquid level detector 206, a liquid control valve 208, and a controller 210.

The multiphase production fluid 108 may flow into the gas-liquid separator 116 via the production fluid flow line 115. As described herein, the multiphase production fluid 108 may be a mixture of oil, natural gas, water, and sand, which can be separated into distinct components within the multiphase separation system 200A.

The gas-liquid separator 116 may include the first flow line 118 for the separated gas 120 that may exit a top-gas outlet 212 and a second flow line 122 for the separated liquid 124 that may exit a liquid outlet 214. To regulate the liquid level 117 in the gas-liquid separator 116, the first control loop 204 may be coupled to the liquid level detector 206, the liquid control valve 208, and the controller 210. The liquid level detector 206 measures the liquid level 117 in the gas-liquid separator 116 and transmits a signal associated with that measurement to the controller 210, for example, a proportional-integral derivative (PID) controller. The liquid control valve 208, which is located downstream of the gas-liquid separator 116 and is disposed in the second flow line 122 including the separated liquid 124, is the primary mechanism for regulating the liquid level 117 in the gas-liquid separator 116.

The controller 210 compares a measured value provided by the liquid level detector 206 with a predetermined value, such as a set-point value. If the measured value is off-set from the set-point value, the controller 210 may adjust the liquid control valve 208. For example, the liquid control valve 208 may be actuated to increase an open position to release the separated liquid 124 through the liquid outlet 214 at a higher flow rate to lower the liquid level 117 in the gas-liquid separator 116 to meet the set-point value. Further, the liquid control valve 208 may be actuated to increase a closed position to decrease the flow rate of the separated liquid 124 through the liquid outlet 214 and, thus, increase the liquid level 117 in the gas-liquid separator 116.

The liquid-liquid separator 126 may further separate the separated liquid 124 to generate the separated oil 130, which flows from an outlet 218 proximate the top of the liquid-liquid separator 126 ("top oil outlet") and into the oil flow line 134, and the separated water 128, which flows from an outlet 220 proximate the bottom of the liquid-liquid separator 126 ("bottom water outlet") and into the water flow line 132. As previously stated, one of the components of the control system 202 includes the second control loop 205. The second control loop 205 regulates the interface level 140 in the liquid-liquid separator 126. As shown in FIG. 2A, the second control loop 205 includes an interface level detector 222, a controller 228, the oil pump 136 with an adjustable speed, and the water pump 138 with an adjustable speed. As will be later discussed, the second control loop 205 of the control system 202 may also include an oil control valve 224 and a water control valve 226 to control the interface level 140 of the liquid-liquid separator 126 as a redundancy approach.

The interface level detector 222 may include a nucleonic level detector, a differential pressure (DP) level detector, or guided wave radar technology, among other types of detectors used to measure liquid-liquid interface levels. Although other configurations exist, the interface level detector 222 may be attached to the liquid-liquid separator 126, as shown in FIG. 2A. Level control of the interface level 140 in the liquid-liquid separator 126 may lead to minimized emulsion carryover in either the top oil outlet 218 or the bottom water outlet 220.

The oil pump 136 and the oil control valve 224 may be located in the oil flow line 134. The water pump 138 and the water control valve 226 may be located in the water flow line 132. The multiphase separation system 200A, as depicted in FIG. 2A, uses only the oil pump 136 and the water pump 138 in the second control loop 205 to regulate the interface level 140 in the liquid-liquid separator 126. As described, both the oil pump 136 and the water pump 138 are adjustable speed pumps. However, in cases where minimum slugging conditions exist, the oil pump 136 and the water pump 138 may include fixed speed pumps. Both the adjustable speed pumps and the fixed speed pumps may include centrifugal, positive displacement, or progressive cavity pumps, among others.

In operation, the interface level detector 222 may transmit signals to the controller 228 associated with the oil pump 136 and the water pump 138. The transmitted signals may include a measured value of the interface level 140 in the liquid-liquid separator 126. Once the transmitted signals are received, the controller 228 may compare the measured value to a set-point value for the interface level 140 in the liquid-liquid separator 126. Specifically, an error signal can be calculated based on the difference between the set-point value and the measured value. Based on the calculated error signal, the controller 228 can adjust the speeds of the oil pump 136 and the water pump 138, individually, using the adjustable speeds to regulate the interface level 140 in the liquid-liquid separator 126.

In some embodiments, the controller 228 may include an invert action split range controller, in which the controller output for the speed of the oil pump 136 is the inverse of the controller output for the speed of the water pump 138. As a result, the second control loop 205 may exhibit a decrease in response times to reach the set-point value, as compared to conventional control loop systems.

In some embodiments, the second control loop 205 may use the oil control valve 224 and the water control valve 226 as a secondary control feature to improve reliability and availability, as indicted by the dotted lines 229. In particular, the oil control valve 224 and the water control valve 226 may provide further control and operational redundancy, for example, in the event that the adjustable speeds on the oil pump 136, the water pump 138, or both, cease to function.

For example, based on a calculated error signal between a set-point value and a measured value of the interface level 140 in the liquid-liquid separator 126, the controller 228 can adjust the actuation of the oil control valve 224 and the water control valve 226 to regulate the interface level 140. In embodiments, where the controller 228 may include an invert action split range controller, the actuation of the oil control valve 224 is inversely controlled from the actuation of the water control valve 226. For example, the oil control valve 224 may be actuated to increase an open position to release the separated oil 130 through the top oil outlet 218 at a higher flow rate to raise the interface level 140 in the liquid-liquid separator 126 to meet the set-point value. Simultaneously, the water control valve 226 may be actuated to increase a closed position to decrease the flow rate of the separated water 128 through the bottom water outlet 220 to raise the interface level 140 in the liquid-liquid separator 126 to meet the set-point value. As a result of the invert actions of the oil control valve 224 and the water control valve 226, the interface level 140 of the liquid-liquid separator 126 may be controlled.

In some embodiments, the multiphase separation system 200A may include an oil recycle line 230 and a water recycle line 232 to protect against a minimum flow condition. The oil recycle line 230 may recycle a portion of the total volume of the oil discharged from the oil pump 136 to upstream of the oil pump 136. Likewise, the water recycle line 232 may recycle a portion of the total volume of the water discharged from the water pump 138 to upstream of the water pump 138.

As shown in FIG. 2B, as primary control elements to control the interface level 140 of the liquid-liquid separator 126, the second control loop 205 may include the interface level detector 222, the controller 228, the oil pump 136 with an adjustable speed, the water pump 138 with an adjustable speed, the oil control valve 224 and the water control valve 226. When the controller 228 is an invert action split range controller, the speed of the oil pump 136 and the actuation the oil control valve 224 may be adjusted to operate inversely from the speed of the water pump 138 and the actuation of the water control valve 226. As a result, the inverse actions may be used to control the interface level 140 between the separated oil 130 and the separated water 128 in the liquid-liquid separator 126. The facilities and arrangement of the facilities is not limited to that shown in FIG. 2, as any number of configurations and other facility types may be used in embodiments.

Figure 3:
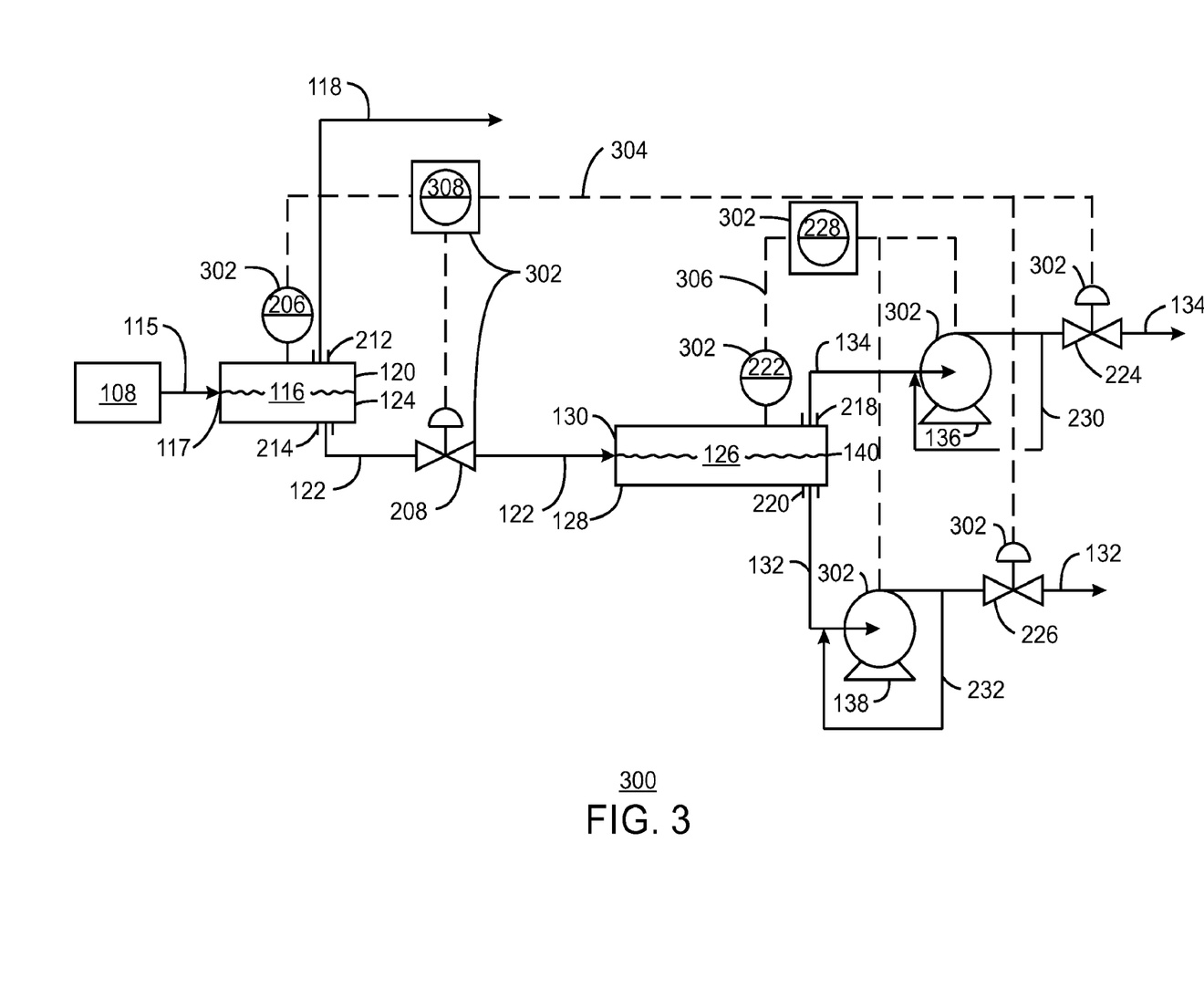
FIG. 3 is a block diagram of another multiphase separation system including a control system that includes a first control loop and a second control loop, in accordance with one or more embodiments of the present disclosure.

FIG. 3 is a block diagram of another multiphase separation system 300 including a control system 302 that includes a first control loop 304 and a second control loop 306. Like numbered items are as described with respect to FIGS. 1 and 2. As shown in FIG. 3, to regulate the liquid level 117 in the gas-liquid separator 116, the first control loop 304 may implement the liquid level detector 206, a controller 308, the liquid control valve 208, the oil control valve 224, and the water control valve 226.

The liquid level detector 206 measures the actual level of the liquid level 117 in the gas-liquid separator 116 and transmits a signal associated with that measurement to the controller 308, for example, a proportional-integral derivative (PID) controller. The controller 308 compares the measured value to a predetermined value, such as a set-point value. If the measured value is off-set from the set-point value, the controller 308 may adjust the liquid control valve 208, the oil control valve 224, and the water control valve 226. In particular, the control valves, 208, 224, and 226, may be actuated simultaneously or non-simultaneously, to regulate the liquid level 117 in the gas-liquid separator 116. For example, if the liquid level 117 is not lowered by opening the liquid control valve 208, the controller 308 may adjust the oil control valve 224, the water control valve 226, or both to a more open position to release the separated liquid 124 and thus, lower the liquid level 117.

The second control loop 306 does not regulate an interface level 140 in the liquid-liquid separator 126 using a redundancy approach that includes the oil control valve 224 and the water control valve 226 in the event that the oil pump 136 and the water pump 138 cease to function. Instead, the second control loop 306 includes the oil pump 136 and the water pump 138 with adjustable speeds as the primary control elements to regulate the interface level 140 in the liquid-liquid separator 126. As previously discussed, the controller 228 may include an invert action split range controller, in which the controller output for the speed of the oil pump 136 is the inverse of the controller output for the speed of the water pump 138. The facilities and arrangement of the facilities is not limited to that shown in FIG. 3, as any number of configurations and other facility types may be used in embodiments.

One of the purposes for a control system includes maintaining a process variable, such as level, pressure, flow rate, or temperature, among other dynamic process variables, at a set-point value, e.g., in a state of equilibrium. For the control system, the set-point value may be defined as the target value for the process variable that is used as the standard configuration for the system. When the measured value changes due to a disturbance, a system response is the ability of the control system to recover from the disturbance and return to the set-point value. The system response can be classified as one of three types of damping functions that can be used to describe the tuning of a controller to return the measured value to the set-point value following the disturbance.

Figure 4:
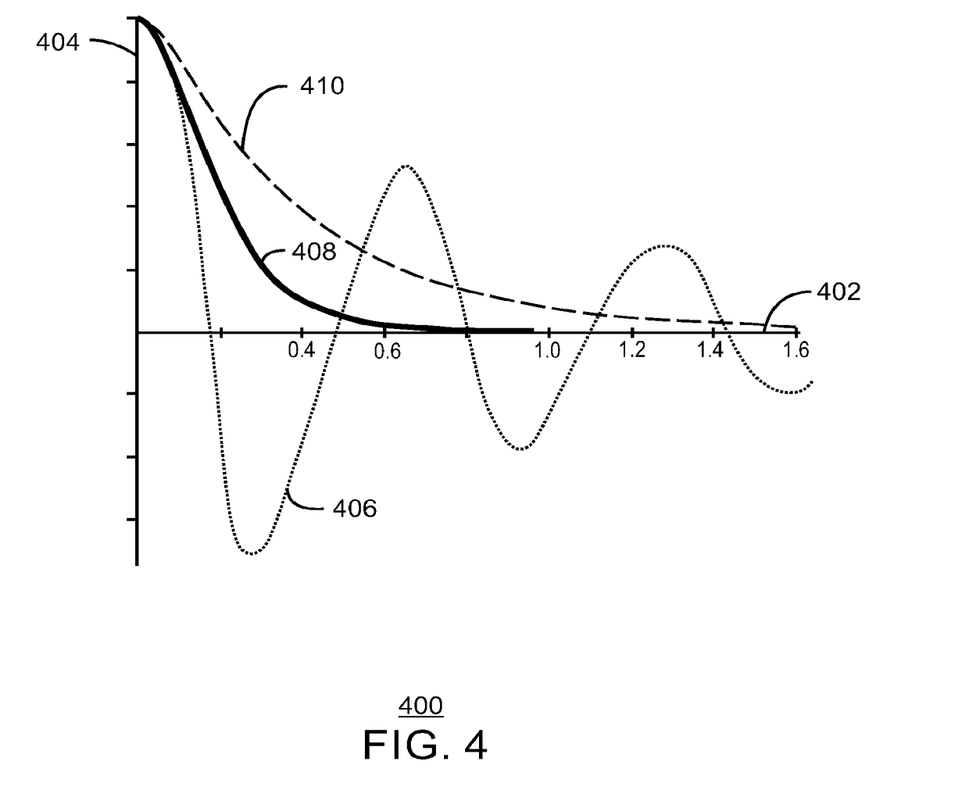
FIG. 4 is a plot of exemplary tuning/damping functions in a control system, in accordance with one or more embodiments of the present disclosure.

FIG. 4 is a plot 400 of exemplary tuning/damping functions in a control system. In FIG. 4, the x-axis 402 represents time in seconds or other units from a disturbance in the control system. The y-axis 404 represents a level deviation from the set-point value, e.g., for an error of interface level as detected by an interface level detector against the set-point value, which is assumed to be located at the x-axis 402. The three types of damping as functions of the level deviation versus time include an underdamped response 406, a critically damped response 408, and an overdamped response 410. The graphical representation of each response 406, 408, and 410 shows whether the level deviation overshoots or undershoots the set-point value, and how quickly the level deviation returns to the set-point value. Each response 406, 408, and 410 may embody a damping ratio, which is a dimensionless measure that describes how the control system returns to equilibrium as a function of time.

After a process disturbance, the underdamped response 406 depicts a deviation for an interface level that oscillates around the set-point value at the x-axis until it reaches the set-point value at the x-axis. For this response, the damping ratio is less than one.

The critically damped response 408 reaches the set-point value at the x-axis in a minimum amount of time without approaching the underdamped response 406. As shown in FIG. 4, the critically damped response 408 is maintained between the bounds of the underdamped response 406 and the bounds of the overdamped 410 with substantially no oscillations about the set-point value at the x-axis. The damping ratio associated with the critically damped response 408 is one.

The overdamped response 410 does not exhibit oscillations about the set-point value at the x-axis 402, but takes a longer amount of time to reach the set-point value at the x-axis when compared to the critically damped response 408. The damping ratio associated with the overdamped response 410 is greater than one.

As an example and as discussed with respect to FIGS. 2A and 2B, the controller 210 of the first control loop 204 may be used to control the liquid level 117 in the gas-liquid separator 116. In particular, the controller 210 may determine an error signal in response to a measured value. The controller 210 may then adjust various controls, such as the liquid control valve 208 to increase or decrease the liquid flow out of the gas-liquid separator 116. To avoid excessive oscillations of the liquid level 117 in the gas-liquid separator 116 or liquid flow that may result in gas carry-under from the gas-liquid separator 116, in embodiments, the controller 210 may be tuned to the critically damped response 408 or overdamped response 410. For example, tuning the controller 210 to the critically damped response 408 may result in the liquid level 117 responding in a substantially quick timeframe to return to the set-point value after a disturbance with substantially no overshooting or undershooting. The liquid level 117 may respond more sluggishly to a disturbance when tuned to the overdamped response 410, in comparison to the critically damped response 408, with substantially no overshooting or undershooting. As a result of tuning the controller 210 to the critically damped response 408 or the overdamped response 410, periods of increased flow rate associated with the gas-liquid separator 116 may be avoided, although at the expense of a slower response.

Further, the controller 228 of the second loop 205 may aid in the control of the interface level 140 in the liquid-liquid separator 126 by adjusting the speeds of the oil pump 136 and water pump 138, individually, using the adjustable speeds in response to a control signal from the interface level detector 222. The controller 228 may also be tuned to a critically damped response 408 or an overdamped response 410 to avoid oscillations of the interface level 140 in the liquid-liquid separator 126. Moreover, with respect to FIG. 3, the controller 308 may also be tuned to a critically damped response 408 or an overdamped response 410 to avoid oscillations of the liquid level 116 in the gas-liquid separator 116. Tuning of the controllers 210, 228, and 308 to the critically damped response 408 or the overdamped response 410 may avoid periods of increased flow rate and thus, results in little to no undershoot or overshoot.

Figure 5:
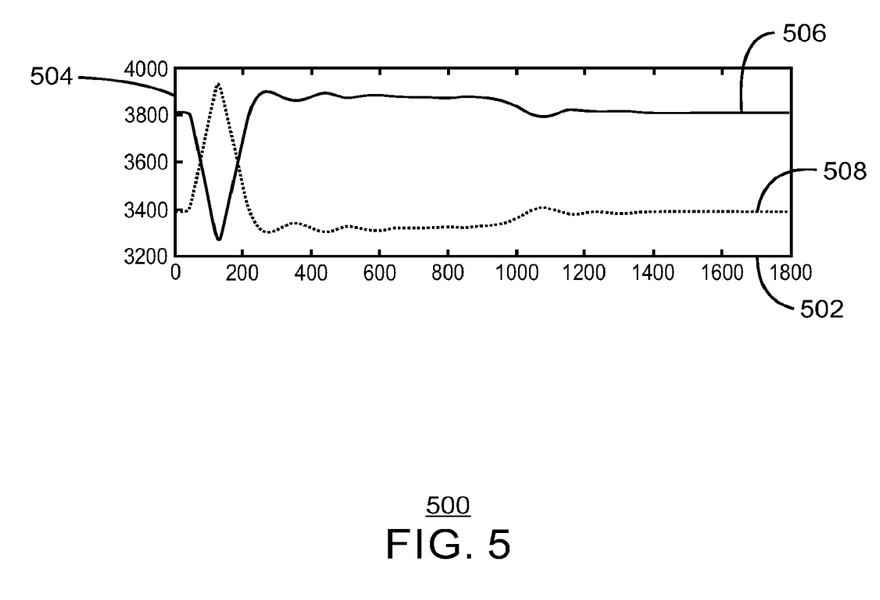
FIG. 5 is a plot of pump speeds that depicts inverse control of the speed of operating pumps over a period of time, in accordance with one or more embodiments of the present disclosure.

FIG. 5 is a plot 500 of pump speeds that depicts inverse control of the speed of operating pumps over a period of time. An x-axis 502 represents time in seconds, while an y-axis 504 represents pump speed in revolutions per minute (RPM). The figure depicts a speed of an oil pump with an adjustable speed, as depicted by line 506, and a speed of a water pump with an adjustable speed, as depicted by line 508, over a period of time. A control system for the oil pump 506 and the water pump 508 may control the speed of the pumps using adjustable speeds for inverse operations. In particular, a controller, such as an invert action split range controller, may be configured to control the speed of the oil pump 506 inversely to the speed of the water pump 508 using the adjustable speeds. As depicted by the plot 500, the flow rate of the oil pump 506 may be decreased using the adjustable speed while the flow rate of the water pump 508 may be increased using the adjustable speed. Over the course of time, as shown in FIG. 5, the speed of the oil pump 506 and the speed of the water pump 508 may tend towards constant pump speeds, depending on the stability of the control variable, which in this embodiment is an interface level in a liquid-liquid separator.

Figure 6:
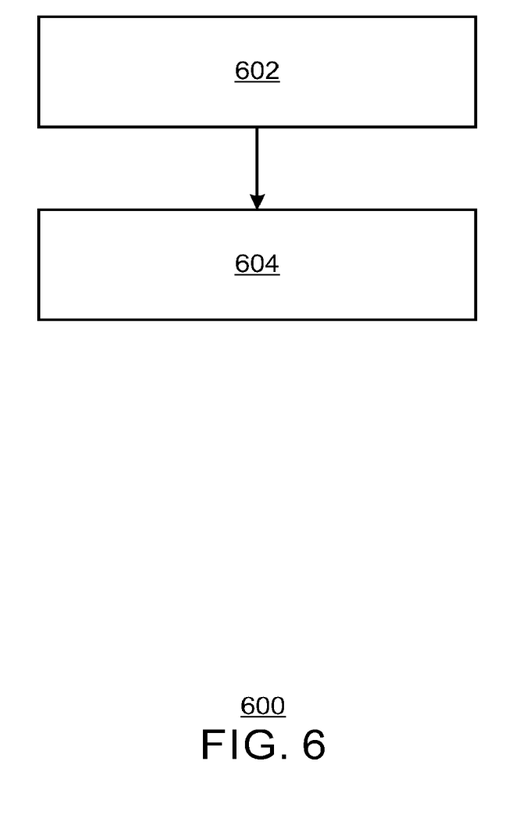
FIG. 6 is flow chart of a method of controlling an interface level in a liquid-liquid separator, in accordance with one or more embodiments of the present disclosure.

FIG. 6 is flow chart of a method 600 of controlling an interface level in a liquid-liquid separator. A multiphase production fluid may be produced from a reservoir and subjected to various treatments. In some embodiments, the multiphase production fluid may initially flow into a gas-liquid separator to form a separated gas and a separated liquid. At block 602, a liquid-liquid separator may receive the separated liquid. The separated liquid may include a two-phase mixture, e.g., a water phase and an oil phase, which, when separated, may create an interface level in the liquid-liquid separator between both phases. At block 604, the interface level in the liquid-liquid separator may be regulated by adjusting a speed of an oil pump with an adjustable speed and a speed of a water pump with an adjustable speed. In some embodiments, a control system associated with the interface level in the liquid-liquid separator may adjust the speed of the oil pump and the water pump inversely to one another, where the oil pump is configured to pump separated oil from the liquid-liquid separator, and the water pump is configured to pump separated water from the liquid-liquid separator.

While the present techniques may be susceptible to various modifications and alternative forms, the exemplary embodiments discussed above have been shown only by way of example. Embodiments may be described herein in relation to subsea separation; however, it is understood such embodiments may be used in any multiphase separation system. It should again be understood that the techniques are not intended to be limited to the particular embodiments disclosed herein. Indeed, the present techniques include all alternatives, modifications, and equivalents falling within the true spirit and scope of the appended claims.

What is claimed is:

1. A multiphase separation system, comprising:
a gas-liquid separator in communication with a liquid-liquid separator positioned downstream of the gas-liquid separator and configured to receive a separated liquid from the gas-liquid separator,
wherein the gas-liquid separator comprises:
a first flow line configured to allow a separated gas to exit a top-gas outlet and a second flow line configured for a separated liquid to exit a liquid outlet,
a liquid level detector that measures a liquid level in the gas-liquid separator and transmits a signal associated with the liquid level in the gas-liquid separator, and
a liquid control valve which is located downstream of the gas-liquid separator and is configured to regulate the liquid level in the gas-liquid separator; wherein the liquid-liquid separator comprises:
an oil pump with an adjustable speed in an oil flow line comprising separated oil, the oil pump configured to pump the separated oil from the liquid-liquid separator;
a water pump with an adjustable speed in a water flow line comprising separated water, the water pump configured to pump the separated water from the liquid-liquid separator;
an oil control valve positioned downstream of the liquid-liquid separator and the oil pump;
a water control valve positioned downstream of the liquid-liquid separator and the water pump;
at least one interface level detector that determines an interface level in the liquid-liquid separator and is configured to transmit signals of a measured value of the interface level in the liquid-liquid separator;
at least one invert action split range controller of the oil pump, the oil control valve, the water pump, and the water control valve configured to receive signals of the measured value of the interface level in the liquid-liquid separator from the at least one interface level detector;
wherein the speed of the oil pump is adjusted to operate inversely from the speed of the water pump, and actuation of the oil control valve is adjusted to operate inversely from actuation of the water control valve to control the interface level in the liquid-liquid separator based on signals transmitted from the at least one invert action split range controller.

2. The multiphase separation system of claim 1, wherein the at least one invert action split range controller is tuned to a critically damped or overdamped condition to maintain the interface level in the liquid-liquid separator at a set-point value.

3. The multiphase separation system of claim 1, wherein the liquid control valve, the oil control valve, and the water control valve are configured to regulate the liquid level in the gas-liquid separator.

4. The multiphase separation system of claim 1, comprising a first controller that receives the signal associated with the liquid level in the gas-liquid separator, wherein the first controller is tuned to a critically damped or overdamped condition to maintain a liquid level in the gas-liquid separator at a set-point value.

5. The multiphase separation system of claim 1, wherein the at least one invert action split range controller is comprised in a controller system having a control loop and wherein the at least one interface level detector transmits signals to the control loop.

6. The multiphase separation system of claim 5, wherein the control loop configures the speed of the oil pump and the actuation of the oil control valve to operate inversely from the speed of the water pump and the actuation of the water control valve.

7. The multiphase separation system of claim 6, wherein the control loop is tuned to either a critically damped or overdamped condition to maintain the interface level in the liquid-liquid separator at a set-point value.

8. A control system, comprising:
a gas-liquid separator;
a liquid-liquid separator;
a liquid control valve positioned between the gas-liquid separator and the liquid-liquid separator in a flow line comprising a separated liquid;
an oil control valve positioned downstream of the liquid-liquid separator and an adjustable speed oil pump in a flow line comprising a separated oil;
a water control valve positioned downstream of the liquid-liquid separator and an adjustable speed water pump in a flow line comprising a separated water;
a control loop to transmit signals to the liquid control valve, the oil control valve, and the water control valve to regulate a liquid level in the gas-liquid separator, wherein the control loop is tuned to either a critically damped or an overdamped condition; and
a controller that controls an interface level of the liquid-liquid separator by adjusting the speed of the oil pump and the speed of the water pump, wherein the speed of the oil pump is controlled to operate inversely from the speed of the water pump.

\* \* \* \* \*